R. W. BRIDGE.
HORSE FOR GLASS CYLINDERS.
APPLICATION FILED APR. 23, 1906.
1,006,995.
Patented Oct. 24, 1911.
2 SHEETS—SHEET 1.
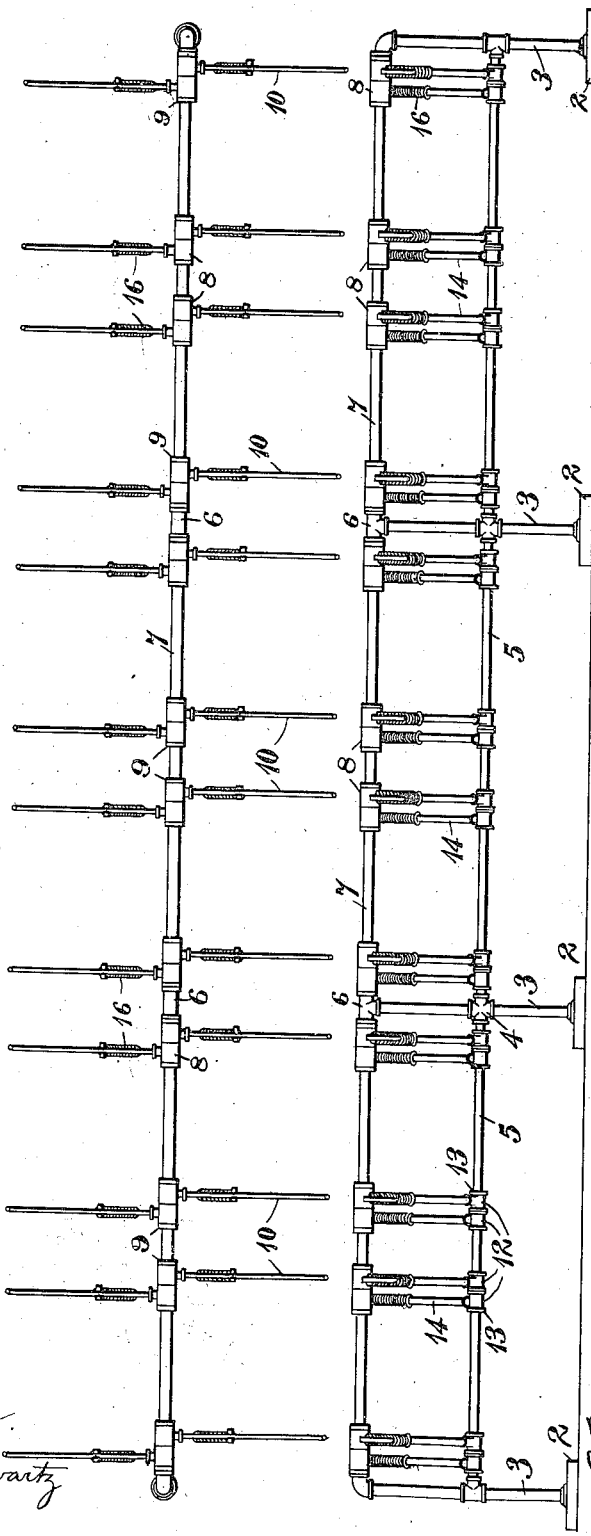

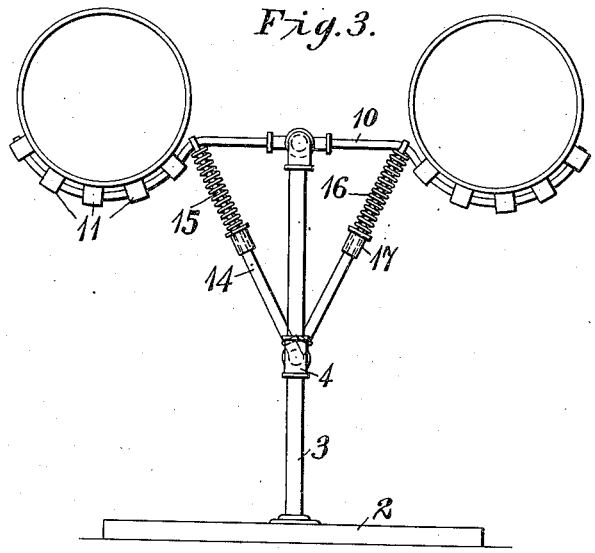
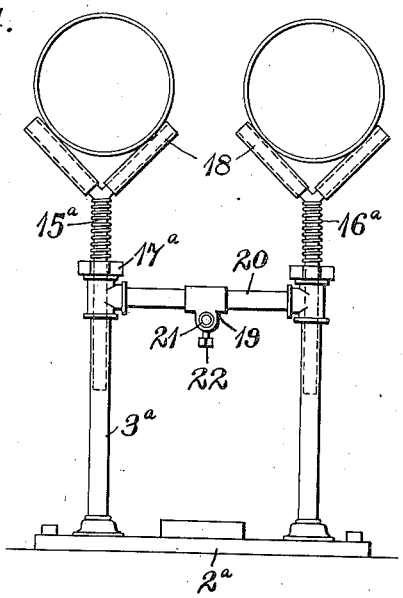

| # UNITED STATES PATENT OFFICE.

RICHARD W. BRIDGE, OF PITTSBURGH, PENNSYLVANIA, ASSIGNOR TO WINDOW GLASS MACHINE COMPANY, OF PITTSBURGH, PENNSYLVANIA, A CORPORATION OF NEW JERSEY.

HORSE FOR GLASS CYLINDERS.

1,006,995.      Specification of Letters Patent.      Patented Oct. 24, 1911.

Application filed April 23, 1906. Serial No. 313,152.

*To all whom it may concern:*

Be it known that I, RICHARD W. BRIDGE, of Pittsburgh, Allegheny county, Pennsylvania, have invented a certain new and useful Horse for Glass Cylinders, of which the following is a full, clear, and exact description, reference being had to the accompanying drawings, forming part of this specification, in which—

Figure 1 is a plan view showing one form of horse constructed in accordance with my invention; Fig. 2 is a side elevation of the same; Fig. 3 is an end view; and Fig. 4 is an end view of a modified form.

My invention relates to the horses arranged for supporting long glass cylinders during their severing into lengths.

The object of the invention is to provide means for automatically adjusting the supporting members of the horse so that they will all bear upon the glass in substantially the same manner or with the same pressure. A substantially uniform support is thus provided for the roller throughout its length.

The invention is also intended to provide supports for each severed length of the cylinder after the cutting or cracking-off operation; also to avoid relative movement of the end of one length across the end of the next length, which would tend to crack and injure the glass.

In the drawings, referring to the form of Figs. 1, 2, and 3, 2 represents a series of separated bases having at their centers vertical gas pipe standards 3. Intermediate of the height of the standards 3 are crosses 4 into which are connected the intermediate lengths 5 of a longitudinal brace. The upper ends of the pipes 3 are provided with T's 6 which connect the upper longitudinal tubular member 7. Threaded upon the upper tubular member 7 are a series of collars 8, which may slide along the member and may turn about it. To each pair of these collars are provided two spacing collars 9 which may be secured in adjusted position by suitable set screws. To each collar 8 is secured the outwardly projecting support 10 having a curved or semi-circular outer portion which may be provided with wooden or asbestos blocks 11, on which the cylinder actually rests. These supporting blocks may be made of any desirable material. The supporting arms of each pair of collars 8 preferably extend in opposite directions as shown in Fig. 1. Loosely mounted on the lower tubular member 5 are a series of collars 12 held in place by adjustable collars 13, which are held by set screws. Each collar 12 is provided with an upwardly and outwardly inclined tubular member 14 within the upper end of which slides the supporting rod 15. A spring 16 surrounds the rod 15 and bears upon a plate or collar 17 on the tube 14, and the upper end of the rod is suitably shaped to engage the intermediate part of the corresponding arm or support 10.

In the use of the device, the arms are properly spaced, together with their supporting spring braces, according to the length of the cylinder and the lengths to be cut off, and of course it is essential that the supports be held in correct alinement. Thus, in Fig. 1, the arms are shown as arranged in pairs with short and long gaps alternating. The cylinder will preferably be severed in the short-gap portion, thus providing two separated supporting arms for each length. When the two rollers are laid upon the supporting arms 10, the springs on the several supporting braces will be depressed, the rods sliding down within their tubular guides. The glass will thus be evenly and uniformly supported throughout its length by the independent yielding of each support. The glass may then be cracked off in any desirable manner, and after severing the sections will be held without substantial crosswise movement relative to each other, owing to the uniform supporting. The tension of the springs may be varied by adjusting the collars 17 at their lower ends lengthwise of the tubular support 14.

In Fig. 4 I show a modified form. In this case the bases 2ª are provided with a pair of vertical supports 3ª, each of pipe form and each containing a vertically sliding rod 15ª. A spring 16ª surrounds the sliding support 15ª and bears at its lower end upon a nut or collar 17ª, its upper end bearing against the upper forked portions 18 of the support. These forked portions may be covered with asbestos, rubber tubes, or any other desirable material. The pairs of supports 3ª may be secured to the floor in line with each other at any desirable distances apart, and then secured in place, and are preferably provided with guides 19 secured to the crossbraces 20, these guides moving over a continuous rod 21, to which they may be secured by set-screws 22.

The advantages of my invention result from the use of yielding supports; also from the separate supports, each of which is independently adjustable or yielding. The series of supports automatically adjust themselves to the glass cylinder and give uniform bearing, as above described. This uniform support will be provided even though the cylinder may differ in size and weight in its different portions. I have shown the apparatus as arranged for supporting two cylinders side by side, but it may be arranged for a series.

The arrangement of the supports may be varied as well as the yielding means, and many other variations may be made without departing from my invention.

I claim:—

1. Apparatus for use in severing glass cylinders into sections comprising a supporting frame having curved arms mounted thereon in pairs adapted to receive the several sections of a cylinder when cut, said arms having independent yielding supports, substantially as described.

2. Apparatus for use in cutting glass cylinders into sections comprising a supporting frame having oppositely extended arms adapted to embrace the cylinder, arranged in pairs to support the separate sections independently, and independent yielding supports for each pair of the arms, substantially as described.

3. A horse for supporting glass cylinders for cutting, comprising a frame, a series of supporting arms pivoted on the frame in pairs adapted to the length of cylinder sections, and mechanism for automatically adjusting the height of the several pairs of arms independently of each other, according to the weight of the sections of the cylinder thereon, substantially as described.

4. A horse for supporting glass cylinders for cutting into sections, comprising a frame, a series of arms adapted to embrace the cylinder independently mounted on said frame and arranged in pairs, means for independently adjusting the height of the arms, including adjustable resilient backing for the arms, substantially as described.

In testimony whereof, I have hereunto set my hand.

RICHARD W. BRIDGE.

Witnesses:
 GEO. B. BLEMING,
 GEO. H. PARMELEE.